United States Patent [19]

Eguchi

[11] Patent Number: 4,736,388
[45] Date of Patent: Apr. 5, 1988

[54] AUTOMATIC FALL BACK AND RESTORE SYSTEM FOR DATA COMMUNICATION

[75] Inventor: Mikiro Eguchi, Tokyo, Japan

[73] Assignee: NEC Corporation, Tokyo, Japan

[21] Appl. No.: 65,437

[22] Filed: Jun. 23, 1987

[30] Foreign Application Priority Data

Jun. 23, 1986 [JP] Japan ............................... 61-145005

[51] Int. Cl.$^4$ ............................................ H04B 15/00
[52] U.S. Cl. ........................................... 375/58; 375/8; 371/5
[58] Field of Search ..................... 375/58, 39, 8, 122; 370/84; 371/5; 379/98

[56] References Cited

U.S. PATENT DOCUMENTS

3,534,264 10/1970 Blasberg et al. ..................... 375/58
3,536,840 10/1970 Sullivan ............................... 375/58
4,438,511 3/1984 Baran .

Primary Examiner—Robert L. Griffin
Assistant Examiner—Marianne Huseman
Attorney, Agent, or Firm—Sughrue, Mion, Zinn, Macpeak and Seas

[57] ABSTRACT

Disclosed is a system for automatically falling back and restoring two transmission speeds in a data transmission system including transmission and reception modems bidirectionally connected through transmission lines. The reception modem includes two automatic equalizers for receiving a reception signal. The first automatic equalizer generates a signal quality detection signal representing degradation of transmission line quality. The second automatic equalizer generates a signal quality detection signal representing restoration of transmission line quality. The first automatic equalizer changes reference values for equalization correction in response to both the signal quality detection signals and generates an equalized signal. One of the two signal quality detection signals is selected by a selector, and the selected signal is sent to the transmission modem. The transmission modem includes an encoder for encoding a modem output while changing its operation mode in response to the two signal quality detection signals sent from the reception modem. This encoder adds a random bit to each fallen back data point from terminal equipment in the fall back mode and sends the same data point data as in the normal operating state.

4 Claims, 6 Drawing Sheets

| OA | OE | OI | OM |
| OB | OF | OJ | ON |
| OC | OG | OK | OO |
| OD | OH | OL | OP |

FIG.3A

| OA | OA | OC | OC |
| OA | OA | OC | OC |
| OB | OB | OD | OD |
| OB | OB | OD | OD |

AUTOMATIC FALL BACK AND RESTORE SYSTEM FOR DATA COMMUNICATION

BACKGROUND OF THE INVENTION

The present invention relates to an automatic fall back and restore system for data communication and, more particularly, to an automatic fall back and restore system for automatically falling back and restoring a transmission speed in data communication using a data modem having a receiver with an automatic equalizer for equalizing communication line distortion.

In a conventional system, when transmission line degradation occurs and a large number of transmission errors inhibit normal data transmission during data communication between two data transmission apparatuses, a fall back or drop back scheme is employed to reduce the transmission speed to an extent that minimum system transmission can be assured. An error margin for the causes of transmission line degradation is increased to assure normal data transmission although the transmission speed is decreased. A conventional data transmission system using a fall back scheme is disclosed in U.S. Pat. No. 4,438,511. In this data transmission system, the transmission speed is not greatly (e.g., ½) decreased at the time of transmission line degradation, but the number of carriers is decreased to achieve fine adjustment. However, the restore mode is not described in this prior art.

The fallen back transmission system is restored (i.e., the transmission speed prior to the transmission degradation is restored) when the transmission line degradation is restored upon a lapse of a given time. In this state, normal data transmission is resumed.

According to the automatic fall back scheme, a predetermined discrimination level corresponding to a critical value of normal data transmission is set in a data transmission apparatus. When a reception signal reaches the discrimination level, the transmission speed is automatically reduced. Whether the reception signal exceeds the discrimination level due to transmission line degradation can be easily determined by the degree of spreading of a reception signal eye.

In the restore mode, the transmission speed must be actually restored to the speed prior to degradation and restoration of normal operation cannot be assured even if a predetermined period of time has elapsed after the transmission system had fallen back. This is because the transmission speed is reduced and the error margin is increased due to the fall back state and it is difficult to discriminate without actual restore operation whether normal transmission can be performed by restoring the system having operated at the reduced transmission speed. It is impossible to perform automatic restore under such an indefinite condition.

SUMMARY OF THE INVENTION

It is an object of the present invention to provide an automatic fall back and restore system which can eliminate the conventional drawbacks described above and can always assure proper data transmission.

It is another object of the present invention to provide an automatic fall back and restore system wherein even if the transmission speed is restored to the speed prior to the fall back, assurance of restoration of proper transmission can be detected to automatically restore a data transmission apparatus.

An automatic fall back and restore system according to the present invention comprises transmission and reception modems bidirectionally connected to the transmission line.

The transmission modem comprises an encoder for setting the number of types of data to be transmitted in one time slot or data points within one time slot to be l, reducing the number of data points of one time slot from l to k upon reception of a first signal quality detection signal generated by the reception modem and representing degradation of transmission line quality, adding (l-k) data point bits to transmission data and transmitting resultant data as l data points, increasing the number of data points back to l upon reception of a second signal quality detection signal generated by the reception modem and representing restoration of transmission line quality, and outputting the transmission data. The reception modem comprises first automatic equalizing means for receiving the output data from the transmission modem, equalizing the output data, outputting the data as reception data and the first signal quality detection signal on the basis of the reception data, and changing the number of data points as a reference of an equalization correction amount in response to the first and second signal quality detection signals, second automatic equalizing means for receiving the output data from the transmission modem and outputting the second signal quality detection signal, and means, connected to the outputs from the first and second automatic equalizing means, for selecting the first or second signal quality detection signal, and outputting a selected signal quality detection signal to the transmission modem.

DETAILED DESCRIPTION OF THE PREFERRED EMBODIMENTS

Preferred embodiments of the present invention will be described in detail with reference to the accompanying drawings hereinafter.

Figure 1:
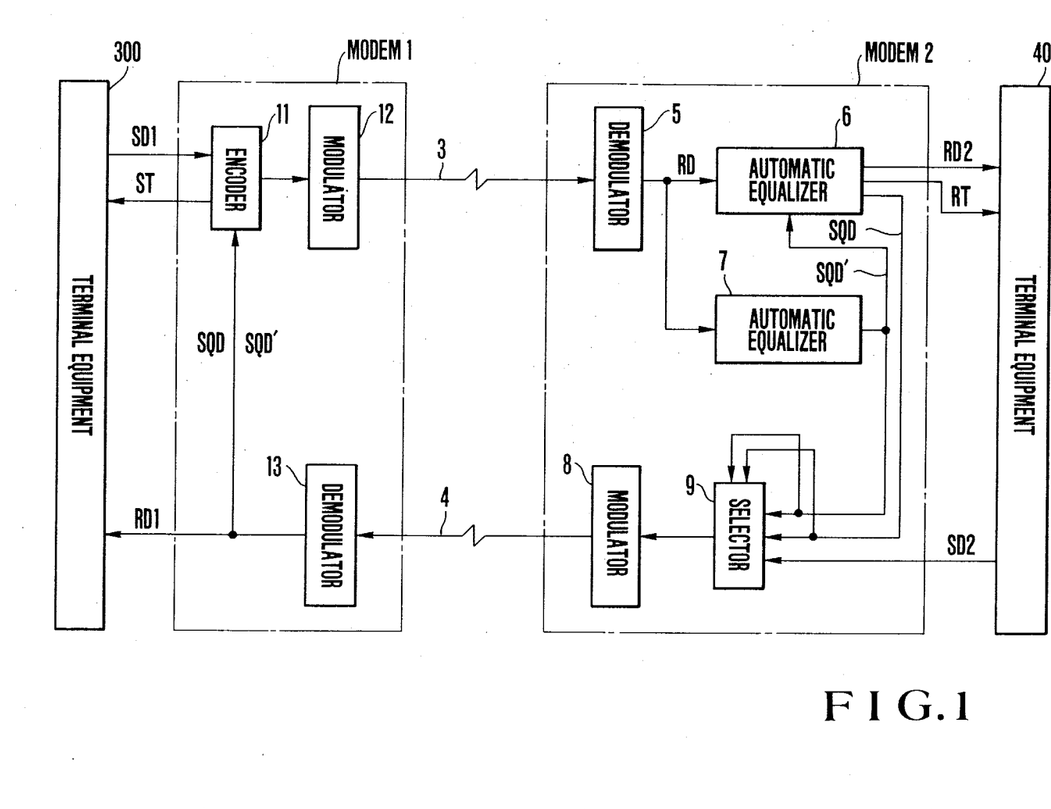
FIG. 1 is a block diagram showing an arrangement according to an embodiment of the present invention.

FIG. 1 is a block diagram showing an embodiment of the present invention. In this embodiment, data is transmitted at a normal transmission speed of 9,600 bps and an abnormal transmission speed (fall back speed) of 4,800 bps.

Referring to FIG. 1, a modem 1 is connected to terminal equipment 300 and a modem 2 is connected to terminal equipment 400. The modems 1 and 2 are connected via transmission lines 3 and 4. The modem 1 is defined as a transmission modem and the modem 2 is defined as a reception modem. The modem 1 includes an encoder 11 for encoding transmission data SD1 input from the terminal equipment 300 and outputting a timing pulse ST for controlling the transmission speed of the terminal equipment 300, a modulator 12 for modulating an output from the encoder 11 and outputting modulated data to the modem 2 through the transmission line 3, and a demodulator 13 for demodulating a signal input from the modem 2 through the transmission line 4 and outputting a demodulated signal RD1 to the encoder 11 and the terminal equipment 300.

The modem 2 comprises a demodulator 5 for demodulating a signal supplied from the modem 1 through the transmission line 3, an automatic equalizer 6 for receiving an output from the demodulator 5 and outputting a reception signal RD2 free from distortion and a timing signal RT to the terminal equipment 400 and a signal SQD representing degradation of reception signal quality, an automatic equalizer 7 for receiving the output signal from the demodulator 5 and outputting a signal SQD' representing that reception signal quality has been restored, a selector 9 for receiving the output signals SQD and SQD' from the automatic equalizers 6 and 7 and outputting a signal SD2 in the normal mode and disabling the signal SD2 when the signal SQD or SQD' is enabled, thereby selectively outputting the signal SQD or SQD', and a modulator 8 for modulating an output from the selector 9 and transmitting a modulated signal to the modem 1 through the transmission line 4.

Figure 2:
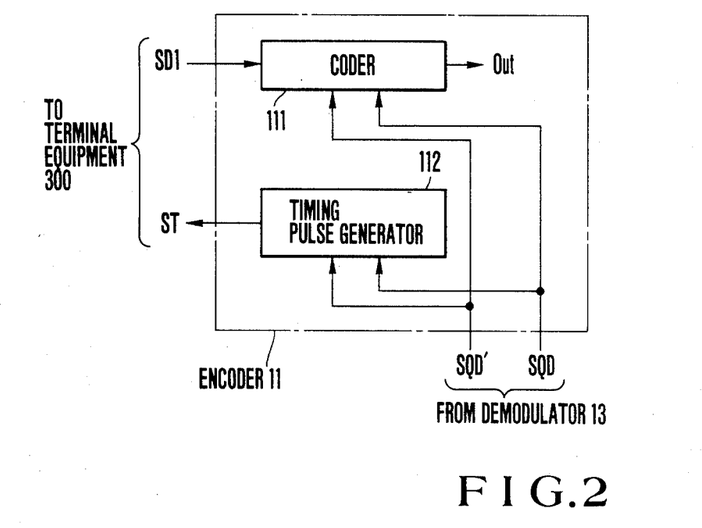
FIG. 2 is a block diagram showing an arrangement of an encoder shown in FIG. 1.

FIG. 2 is a block diagram showing an arrangement of the encoder 11 shown in FIG. 1. Referring to FIG. 2, when a coder 111 receives the 9,600- or 4,800-bps sending signal from the terminal equipment 300, the coder 111 receives the sending signal SD1. Upon reception of the 9,600-bps signal, the coder 111 outputs 4-bit data per time slot. However, upon reception of the 4,800-bps signal, the coder 111 outputs 2-bit data per time slot. The signal quality detection signals SQD and SQD' from the modem 2 are supplied to a timing pulse generator 112 through the demodulator 13.

Figure 3A:
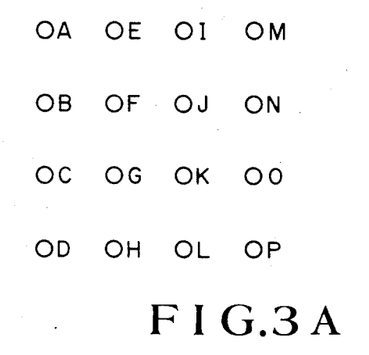
FIG. 3A is a view for explaining the operation in the normal transmission speed.
Figure 4A:
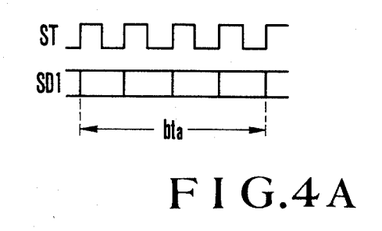
FIG. 4A is a view for explaining the operation in the normal transmission speed.

In the normal mode, the transmission data DS1 is 9,600-bps data, and the coder 111 outputs one of 16 kinds of data or 16 data points A to P (FIG. 3A) every four bits in the time slot. In this case, the relationship between the timing signal ST and the transmission data SD1 is shown in FIG. 4A. In FIG. 4A, symbol bta represents one time slot.

Figure 3B:
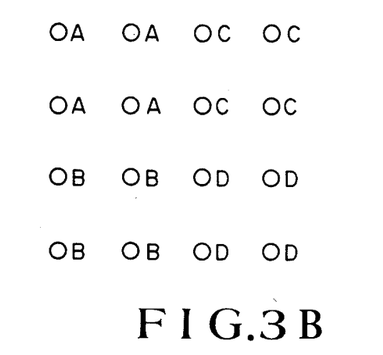
FIG. 3B is a view for explaining the operation in the fall back mode.
Figure 4B:
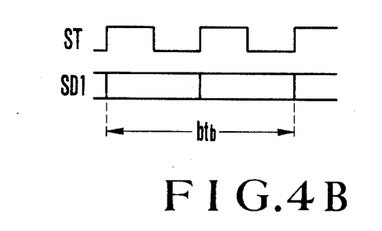
FIG. 4B is a view for explaining the operation in the fall back mode.

When the signal quality detection signal SQD is enabled, the output ST from the timing pulse generator 112 has a transmission speed of 4,800 bps, thereby setting the transmission speed of the transmission data SD1 to 4,800 bps. In this case, the relationship between the timing signal ST and the transmission data SD1 in the time slot btb is shown in FIG. 4B. The number of 2-bit data transmitted within one time slot is four, i.e., data points A to D. As shown in FIG. 3B, four data A to D are selectively added to other four data A to D to output 16 4-bit data.

Upon reception of the signal quality detection signal SQD' from the modem 2, the timing signal from the timing pulse generator 112 has a transmission rate of 9,600 bps. Therefore, the transmission speed of the sending signal SD1 is increased.

The coder 11 is designed to generate outputs while switching two sending data points, i.e., the points k and l for one data in response to the signal quality detection signal SQD.

Figure 5:
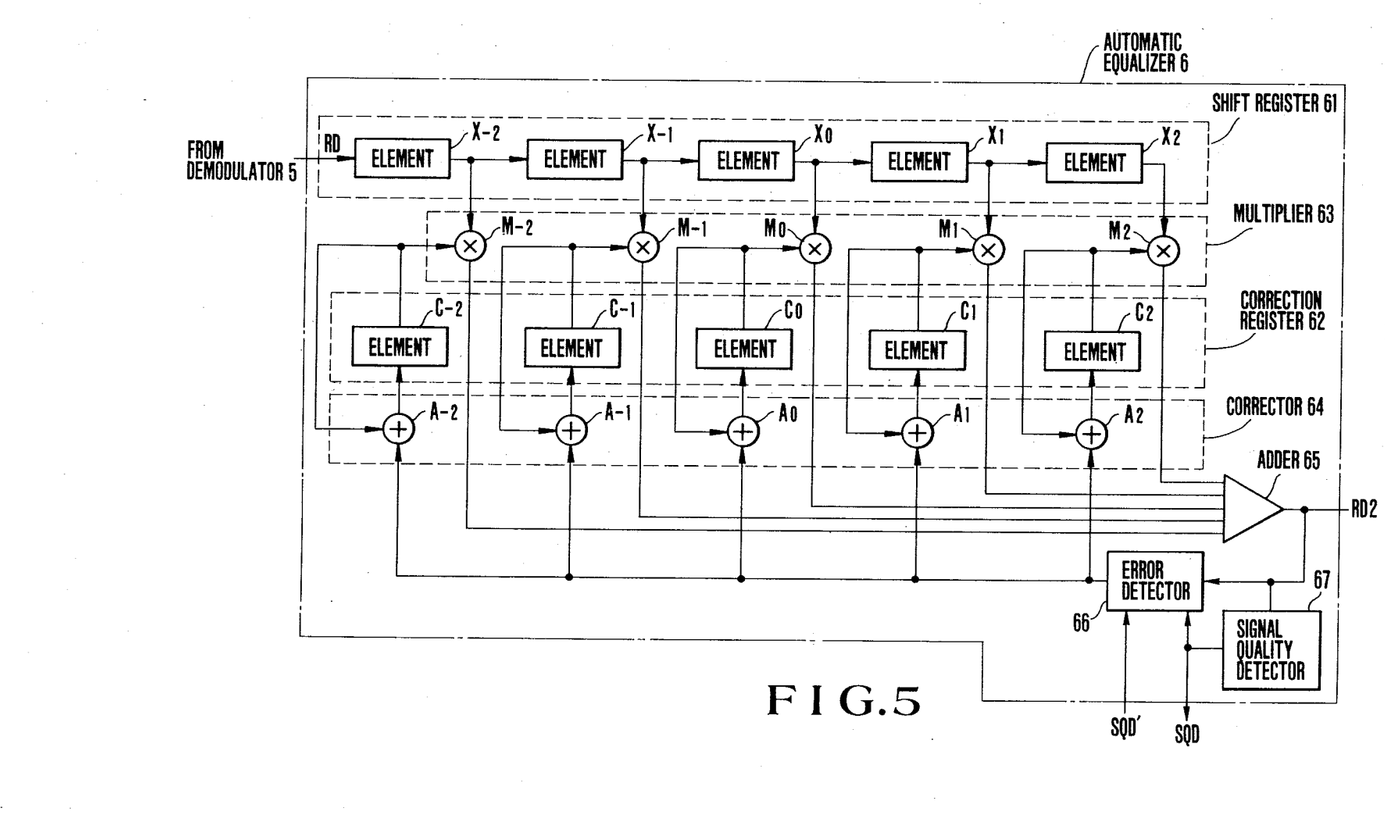
FIG. 5 is a block diagram showing an arrangement of an automatic equalizer 6 shown in FIG. 1.

FIG. 5 is a circuit diagram showing an arrangement of the automatic equalizer 6 shown in FIG. 1. Referring to FIG. 5, reference numeral 61 denotes a shift register for shifting reception data RD from the demodulator 5 in units of time slots; 62, a correction register for accumulating an equalization correction amount; 63, a multiplier; and 65, an adder. The correction register 62, the multiplier 63, and the adder 65 constitute an operating means. The multiplier 63 multiplies the one-time slot output with the equalization correction amount, and adds the products from the multiplier 63, thereby outputting equalized output data RD2. Reference numeral 66 denotes an error detector for calculating a difference between an ideal value and the equalized data from the operating means; and 64, a corrector for correcting the equalization correction value stored in the correction register 62 in accordance with the difference output from the error detector 66.

The reception data RD from the demodulator 5 (FIG. 1) is supplied to an element X-2 of the shift register 61. The data RD is shifted in an order of elements X-1, and X0 to X2 in units of time slots of the data RD. The equalization correction amounts are stored in elements C-2 to C2 of the correction register 62. The contents of the corresponding elements X-2 and C-2 and the corresponding elements X2 and C2 from the shift and correction registers 61 and 62 are supplied to the corresponding elements M-2 to M2 of the multiplier 63 and are multiplied therewith. The outputs from the adder 65 serve as the equalization-compensated reception data RD2. The data RD2 is output to the terminal equipment 400.

The equalization result for the data RD stored in the central element X0 of the shift register 61 is given as follows:

$$\sum_{n=-2}^{2} C_n X_n$$

The reception data RD2 is compared with the ideal value by the error detector 66, and an error, i.e., the difference therebetween is calculated. The difference is supplied to adders A-2 to A2 in the corrector 64 and added to the correction value in each of the adders A-2 to A2 of the correction register 62, further optimizing the correction amount Cn. By repeating the above operation, the error of the output data RD2 from the automatic equalizer 6 is minimized in units of time slots, and equalization with a minimum error can be performed in the normal operating state.

The signal quality detector 67 compares a predetermined value with the reception data RD2 and monitors unequalized components of the output from the automatic equalizer 6. If the unequalized components are larger than the predetermined value, degradation of the reception signal is discriminated. In this case, the signal SQD is enabled and the output from the signal quality detector 67 is supplied to the selector 9 (FIG. 1) and to the error detector 66. The error detector 66 has 16 ideal data points which are supposed to be sent in the normal operating state. If the signal SQD is enabled, the 16 ideal points are reduced to four points. More specifically, if the signal SQD is enabled, 16 special data points shown in FIG. 4B are sent from the encoder 11.

Figure 6:
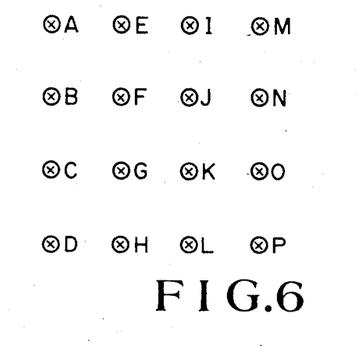
FIGS. 6 and 7 are views for explaining the operation of the circuit shown in FIG. 5.
Figure 7:
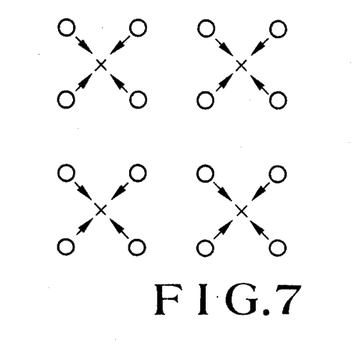

FIGS. 6 and 7 show the relationships between the data points and the ideal values of the error detector 66 in the normal operating state and in the ON state of the signal SQD, respectively. Mark o in FIGS. 6 and 7 represents a data point of the reception data, and mark x represents an ideal value.

As shown in FIG. 7, when the signal SQD is enabled, the data points (o) of the reception data are respectively equalized with the ideal values (x). Therefore, data A to D can be output as the output data RD2. For this reason, even if degradation of the transmission line occurs, data transmission with a large error margin can be performed.

The automatic equalizer 6 includes the signal quality detector 67 for detecting the signal quality detection signal SQD. In this manner, the error detector 66 for generating the difference between the equalized data and the ideal value selectively switches two ideal values of points m or l in response to an output from the the signal quality detector 67 or an output from the signal quality detector 77 for detecting a signal quality detection signal SQD' (to be described later).

Figure 8:
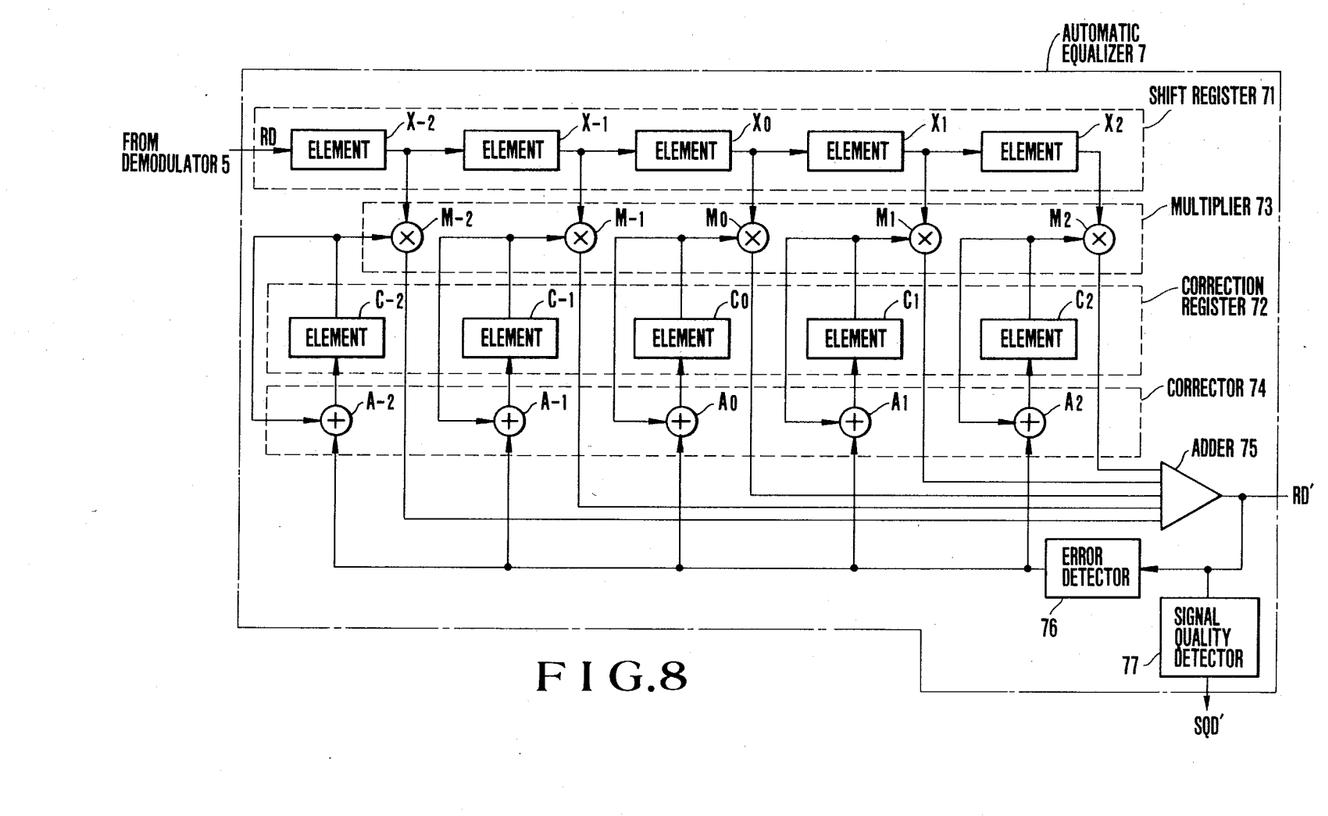
FIG. 8 is a block diagram showing an arrangement of an automatic equalizer 7 shown in FIG. 1.

The automatic equalizer 7 receives the reception signal RD from the demodulator 5 and eliminates distortion caused by degradation of the transmission line in the same manner as in the automatic equalizer 6. FIG. 8 is a block diagram showing an internal arrangement of the automatic equalizer 7.

Referring to FIG. 8, a shift register 71, a correction register 72, a multiplier 73, a corrector 74, and an adder 75 have the same functions and electrical connections as those of the components 61 to 65 in FIG. 5, and a detailed description thereof will be omitted.

The automatic equalizer 7 differs from the automatic equalizer 6 in that the error detector 76 always have ideal values corresponding to 16 data points and that the signal quality detector 67 detects good quality and outputs the signal quality signal SQD'. The signal quality detector 77 has the same characteristics as those of the signal quality detector 67 in the automatic equalizer 6. The output signal SQD' is input to the error detector 66 (FIG. 1) of the automatic equalizer 6. The signal quality detector 77 determines whether the original transmission speed, i.e., 9,600 bps can be restored. When the signal quality detector 77 detects that the 16 data points can be accurately discriminated after the signal SQD is enabled, the signal SQD' is disabled to request data transmission with 16 data points at a transmission speed of 9,600 bps. Also, the ideal values of the error detector 66 in the automatic equalizer 6 are changed to the original 16 points.

The automatic equalizer 7 comprises the error detector 76 always having 16 ideal values and the signal quality detector 77 for detecting the signal quality.

The operation of the automatic fall back mode and restore system having the above configuration will be described hereinafter.

When degradation of the transmission line occurs, the automatic equalizer 6 detects degradation of the reception signal and the signal quality detection signal SQD is enabled. The automatic equalizer 6 causes the error detector 66 to reduce the 16 ideal points to four points to assure a large error margin. At the same time, information representing that the signal SQD is enabled is transmitted to the opposite station so that the transmission speed is fallen back from 9,600 bps to 4,800 bps in the encoder 11 in the modem 1 through the selector 9, the modulator 8, and the transmission line 4. The 16 sending data points are changed into the 16 special data points shown in FIG. 3B. Since the automatic equalizer 6 has four ideal values, it outputs 4,800-bps equalized data. The automatic fall back cycle is thus completed.

The automatic equalizer 7 monitors recovery of reception signal degradation, using 16 ideal values. In this state, the signal quality detection signal SQD' is detected. When transmission line degradation is restored, the number of ideal values in the error detector 66 of the automatic equalizer 6 in the self station is changed to the original number, i.e., 16 data points. The encoder 11 in the modem 1 is operated to return the transmission speed to 9,600 bps and the 16 original data points are output, thus achieving the automatic restore cycle.

Figure 9:
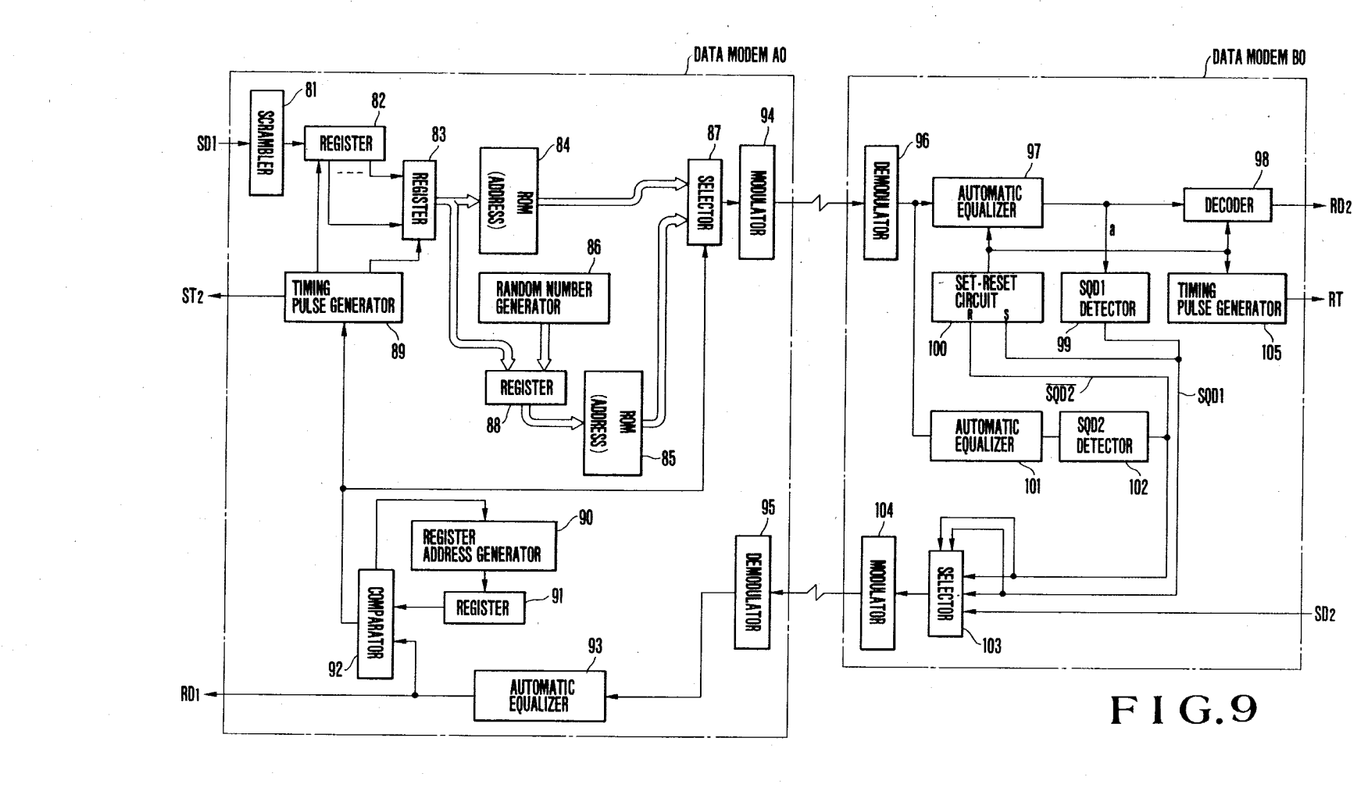
FIG. 9 is a block diagram showing an arrangement according to another embodiment of the present invention.

FIG. 9 is a block diagram showing another embodiment of the present invention. The operation of the circuit shown in FIG. 9 will be described. In the normal operating state, sending data SD1 input to a data modem A0 is scrambled by a scrambler 81, and the scrambled data is input to a register 82. The scrambler 81 aims at assuring automatic equalization of automatic equalizers 97 and 101 in a data modem B0 in the receiving end. The random characteristics of the data allow accurate approximation of data point information representing transmission line degradation. When the transmission speed is 9,600 bps, the data is received by a register 82 at the transmission speed of 9,600 bps. Thereafter, the data is input to a register 83 at a 2,400-Hz cycle every four bits. The data input from register 82 every four bits serves as address data for a ROM 84. In the normal state of FIG. 6, one of 16 data points A to P is addressed, and the content at the designated address is output. A selector 87 selects an output from the ROM 84, and the selected output is supplied to a modulator 94.

In the modem B0, data sent through a demodulator 96 is input to an automatic equalizer 97, one of the data points A to P is removed, and the remaining data points are output. Processing opposite to that of the modem A0 is performed in a decoder 98, and the processed result is output as reception data RD2. An output from an SQD1 detector is normally off ("0"), and a set-reset circuit 100 is not influenced. The output from the demodulator 96 is also supplied to an automatic equalizer 101. Since the automatic equalizer 101 has the same reference value as that of the automatic equalizer 97, an output $\overline{SQD2}$ from an SQD2 detector 102 is ON ("1") and the set-reset circuit 100 is reset.

Figure 10:
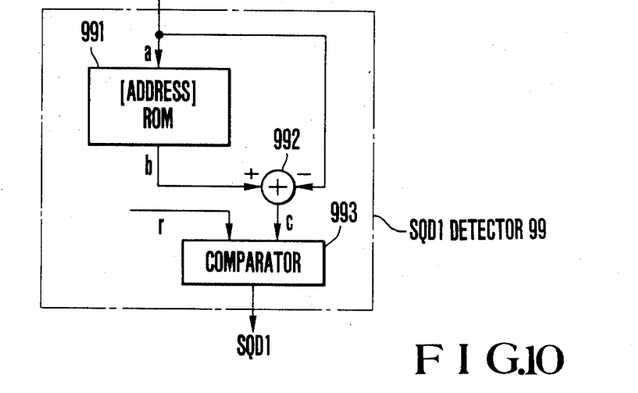
FIG. 10 is a block diagram showing part of FIG. 9.

When the transmission line is degraded, i.e., an abnormal state occurs, modulated data is spread in the modem B0. The automatic equalizer 97 cannot discriminate one data point from the remaining data points. After equalization, received data spreading or an equalization error continues. In this case, the SQD1 detector 99 detects the above degradation. FIG. 10 shows a detailed arrangement of the SQD1 detector 99. A difference c between an automatic equalizer output a and a reference value output b extracted from a ROM 991 in response to the automatic equalizer output a as an address signal is calculated by a subtracter 992. The difference c is compared with a predetermined reference value r by a comparator 993. If the difference c is larger than the reference value r, the output signal SQD1 is set at logic "1", thereby setting the set-reset circuit 100. The signal of logic "1" is supplied to the automatic equalizer 97 and hence changing the 16 equalization ideal values into four points (FIG. 7). An output of logic "1" from the set-reset circuit 100 is supplied to the decoder 98 to change the decoding speed from 9,600 bps to 4,800 bps.

An output SQD1 of logic "1" is sent to the modem A0 through the selector 103. An output RD1 output from the automatic equalizer 93 and equivalent to that from the automatic equalizer 97 is supplied to a comparator 92 and is compared with the content of a register 91. When the signal SQD1 of logic "1" is detected, it is sent to a timing pulse generator 89 and a selector 87. The register 91 stores information for discriminating the signal SQD1 of logic "1" from that of logic "0" and the signal SQD2 of logic "1" from that of logic "0". This information is output in response to a sequentially incremented address output from a register address generator 90. The timing pulse generator 89 is switched to change the transmission speed from 9,600 bps to 4,800 bps of a timing pulse output ST in response to the signal SQD1 of logic "1". The selector 87 selects the output from the ROM 85. More specifically, the data is stored in the register 82 at a speed of 4,800 bps. The data is input to the register 83 in a 2,400-Hz cycle every two bits. The 2-bit output from the register 83 is input to the register 88. The ROM 85 is addressed in response to the 2-bit signal and one of the 16 data points A to D is selected. One of the four points, e.g., A is output to the selector 87 in response to the 2-bit output from a random generator 86. Even if the transmission speed is set to 4,800 bps, one of the 16 points is set.

Figure 11:
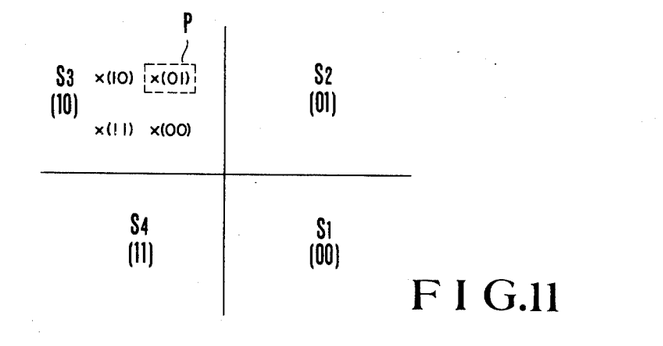
FIG. 11 is a view for explaining the operation of the circuit shown in FIG. 9.

FIG. 11 shows address generation operation in the register 88. Referring to FIG. 11, four quadrants S1, S2, S3, and S4 respectively correspond to input data "00", "01", "10", and "11". If the output from the register 83 is, for example, "10", the third quadrant S3 is specified. If the output from the random generator 86 is set to "01", the illustrated point P in the third quadrant S3 is selected as a sending point.

The automatic equalizer 97 in the modem B0 has four ideal values for 4,800 bps. As shown in FIG. 7, even if the reception data is spread due to transmission line degradation, accurate discrimination can be achieved. The SQD1 detector 99 outputs a signal of logic "0". Meanwhile, the automatic equalizer 101 always equalizes the received sixteen points with sixteen ideal values. It should be noted that the signal is $\overline{SQD2}$="0" due to transmission line degradation.

The restore mode will be described below. When transmission line degradation is restored, the automatic equalizer 101 in the modem B0 can perform normal equalization. That is, $\overline{SQD2}$="1". The set-reset circuit 100 is reset, and the number of ideal values in the automatic equalizer 97 is changed to the original 16. The decoder 98 and the timing pulse generator 105 restore the original operating states. In other words, the transmission speed is changed from 4,800 bps to 9,800 bps. Information of $\overline{SQD2}$="1" is sent to the modem A0 in the opposite station through the selector 103.

The signal $\overline{SQD2}$="1" detected by the comparator 92 in the modem A0 is input to the timing pulse generator 89 and the selector 87, thereby restoring the transmission speed of 9,600 bps.

According to the present invention as described above, when the signal quality detection (SQD) signal is enabled, the transmitter causes the encoder for coding to assign m data points to one data and the receiver causes the automatic equalizer having discrimination values for reducing the number of ideal values. This automatic equalizer has the same ideal values as those in the automatic equalizer in the normal operating state. Therefore, the automatic fall back and automatic restore cycles can be achieved to provide practical advantages.

What is claimed is:

1. An automatic fall back and restore system comprising transmission and reception modems bidirectionally connected to a transmission line, said automatic fall back and restore system being used in a data communication system for reducing a transmission speed due to transmission line degradation and restoring the transmission speed upon restoration of transmission line degradation, wherein said transmission modem comprises encoder means for setting the number of types of data to be transmitted in one time slot or data points within one time slot to be l, reducing the number of data points of one time slot from l to k upon reception of a first signal quality detection signal generated by said reception modem and representing degradation of transmission line quality, adding (l–k) data point bits to transmission data and transmitting resultant data as l data points, increasing the number of data points back to l upon reception of a second signal quality detection signal generated by said reception modem and representing restoration of transmission line quality, and outputting the transmission data; and said reception modem comprises first automatic equalizing means for receiving the output data from said transmission modem, equalizing the output data, outputting the data as reception data and the first signal quality detection signal on the basis of the reception data, and changing the number of data points as a reference of an equalization correction amount in response to the first and second signal quality detection signals, second automatic equalizing means for receiving the output data from said transmission modem and outputting the second signal quality detection signal, and means, connected to the output from said first and second automatic equalizing means, for selecting the first or second signal quality detection signal, and outputting a selected signal quality detection signal to said transmission modem.

2. A system according to claim 1, wherein each of said first and second automatic equalizing means comprises shift register means composed of a plurality of elements for shifting data received through said transmission line in units of time slots, correction register means composed of a plurality of elements for storing equivalent correction amounts respectively corresponding to said plurality of elements of said shift register means, sum means for multiplying outputs from said plurality of elements of said shift register means with the equalization correction values stored in said plurality of elements of said correction register means and for adding products to obtain equalized data, error detector means for calculating a difference between the equalized data and an ideal value, and correcting means for updating the equalization correction values stored in said correction register means on the basis of the difference; and each of said first and second automatic equalizing means comprises first and second signal quality detectors for determining quality of the reception signal and outputting the first and second signal quality detection signals, said error detector means in said first automatic equalizing means being adapted to change the ideal values in response to the first and second signal quality detection signals.

3. A system according to claim 1, wherein said encoder means in said transmission modem comprises:

a register for outputting data of k data points in response to the first and second signal quality detection signals;

a random generator for generating a random number corresponding to l-k data points;

a first memory addressed by data constituted by output bits of said random generator;

a second memory addressed in response to an output from said register of said encoder means to output a designated content thereof; and a transmission selector for selecting an output from said first or second memory in response to the first and second signal quality detection signals and for sending a selected signal onto said transmission line.

4. An automatic fall back and restore system in a data modem system comprising automatic equalizers each having a shift register for shifting reception data every time slot, a correction register for storing an equalization correction amount, operating means for multiplying the equalization correction amount with an output of each time slot from said shift register and for adding products to output equalized data, a first discriminator for calculating a difference between an ideal value and the equalized data output from said operating means, and a corrector for changing the equalization correction amount on the basis of the difference, wherein a transmitter includes an encoder for generating k or l data points for one time slot in response to a first signal quality detection signal; and a receiver includes: a first automatic equalizer including a first detector for detecting the first signal quality detection signal and for causing said first discriminator to set k or l ideal values in response to an output from said first detector or an output from a second detector for detecting a second signal quality detection signal, a second automatic equalizer including a second discriminator always having l ideal values and said second detector, and a selector for selecting an output from said first or second detector or transmission data in response to the first or second signal quality detection signal, where k, and l are positive integers an k<l.

* * * * *